United States Patent
Gschwind et al.

(10) Patent No.: US 9,110,675 B1
(45) Date of Patent: Aug. 18, 2015

(54) USAGE OF TOC REGISTER AS APPLICATION REGISTER

(71) Applicant: International Business Machines Corporation, Armonk, NY (US)

(72) Inventors: Michael K. Gschwind, Chappaqua, NY (US); Ulrich Weigand, Tubingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/206,463

(22) Filed: Mar. 12, 2014

(51) Int. Cl.
  G06F 9/44 (2006.01)
  G06F 9/45 (2006.01)
  G06F 9/445 (2006.01)

(52) U.S. Cl.
  CPC ... *G06F 8/41* (2013.01); *G06F 8/54* (2013.01)

(58) Field of Classification Search
  None
  See application file for complete search history.

(56) References Cited

U.S. PATENT DOCUMENTS

| | | | | |
|---|---|---|---|---|
| 5,845,118 | A * | 12/1998 | Gheith | 717/158 |
| 6,631,516 | B1 * | 10/2003 | Baumgart et al. | 717/143 |
| 7,228,527 | B1 * | 6/2007 | Phillips et al. | 717/127 |
| 7,320,121 | B2 * | 1/2008 | Krueger | 717/106 |
| 8,261,244 | B2 * | 9/2012 | Pietrek | 717/130 |
| 8,607,211 | B2 | 12/2013 | Blainey et al. | |
| 8,612,959 | B2 | 12/2013 | Blainey et al. | |
| 8,615,745 | B2 | 12/2013 | Blainey et al. | |
| 8,615,746 | B2 | 12/2013 | Blainey et al. | |
| 2002/0188931 | A1 * | 12/2002 | Ewart et al. | 717/154 |
| 2003/0217355 | A1 * | 11/2003 | Hack et al. | 717/129 |
| 2006/0112374 | A1 * | 5/2006 | Oliva | 717/127 |
| 2009/0089764 | A1 * | 4/2009 | Lai et al. | 717/143 |
| 2011/0214109 | A1 * | 9/2011 | Pedersen | 717/128 |
| 2013/0042223 | A1 * | 2/2013 | Hinkle | 717/128 |
| 2013/0086570 | A1 * | 4/2013 | Blainey et al. | 717/165 |
| 2013/0185705 | A1 * | 7/2013 | Kuesel et al. | 717/152 |

\* cited by examiner

*Primary Examiner* — Insun Kang
(74) *Attorney, Agent, or Firm* — Cantor Colburn LLP; Steven Bennett

(57) ABSTRACT

Embodiments relate to usage of a table of contents (TOC) register as an application register. An aspect includes receiving, by a computer system, application object code comprising a first function call from a calling function to a first callee function, and a symbol table entry in a symbol table comprising a first TOC register usage indicator that is associated with the first callee function. Another aspect includes determining that the first callee function of the first function call does not require a TOC pointer based on the first TOC register usage indicator that is associated with the first callee function in the symbol table. Another aspect includes based on determining that the first callee function of the first function call does not require a TOC pointer, inserting a TOC save command and a TOC restore command corresponding to the first local function call into the application object code.

8 Claims, 5 Drawing Sheets

400

```
COMPILE SOURCE CODE INTO OBJECT CODE; INSERT PLACEHOLDER INSTRUCTIONS;
GENERATE SYMBOL TABLE INCLUDING TOC REGISTER USAGE INDICATORS
TO INDICATE ANY FUNCTION(S) THAT DO NOT NEED TOC POINTER
401
```

```
STATIC LINKER INSERTS TOC SAVE AND RESTORE COMMANDS
FOR FUNCTION CALLS INTO OBJECT CODE AS NEEDED
BASED ON TOC REGISTER USAGE INDICATORS IN SYMBOL TABLE
402
```

```
EXECUTE OBJECT CODE WITH INSERTED TOC SAVE AND RESTORE COMMANDS
FOR FUNCTION CALLS THAT DO NOT NEED TOC;
SUCH FUNCTIONS USE TOC REGISTER AS APPLICATION DEFINED REGISTER
DURING EXECUTION
403
```

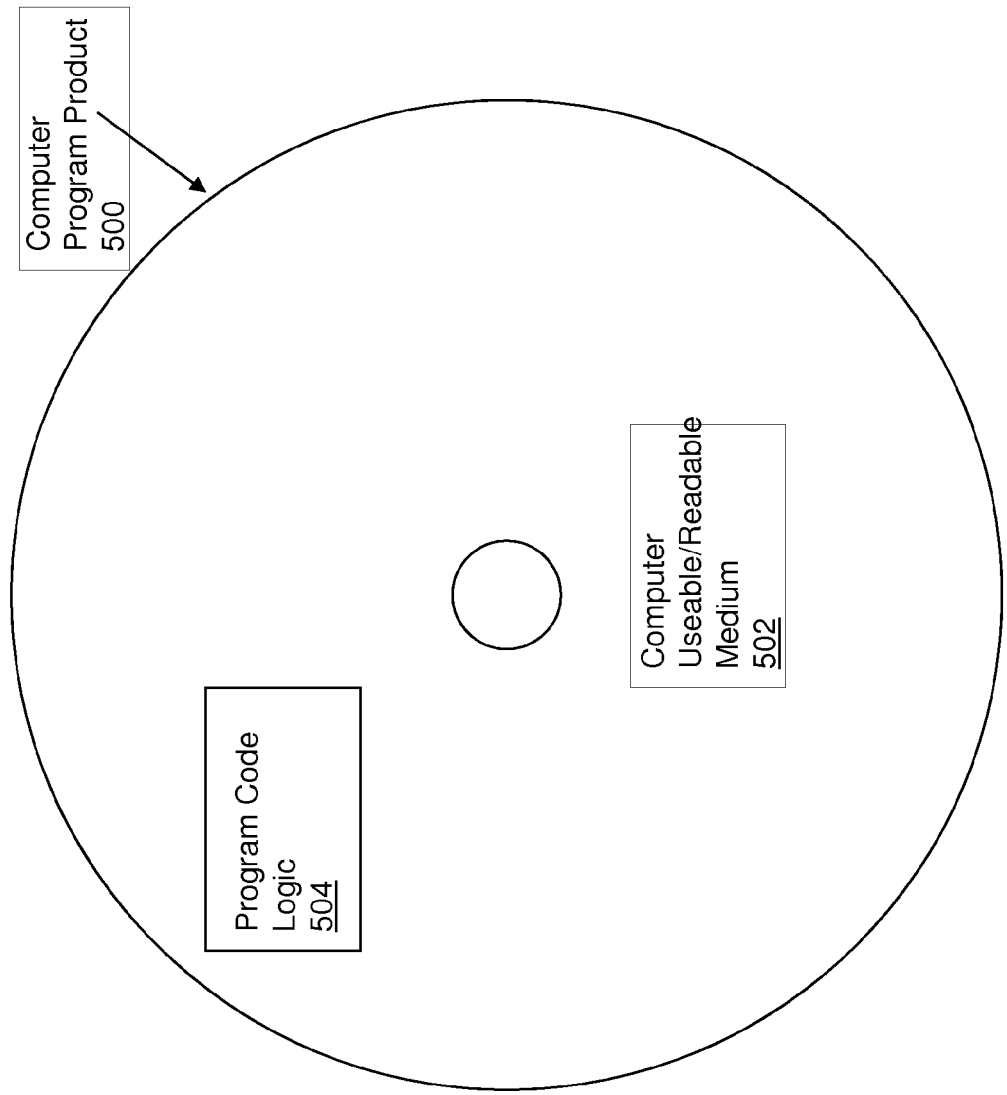

USAGE OF TOC REGISTER AS APPLICATION REGISTER

BACKGROUND

The present invention relates generally to computer systems, and more specifically, to usage of a table of contents (TOC) register as an application register.

In computer software, an application binary interface (ABI) describes the low-level interface between an application program and the operating system or between the application program and another application. The ABI cover details such as data type, size, and alignment; the calling conventions which controls how function arguments are passed and how return values are retrieved; the system call numbers and how an application should make system calls to the operating system; and in the case of a complete operating system ABI, the binary format of object files, program libraries, and so on. Several ABIs (e.g., the Interactive Unix ABI allowing to a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application start-up occurs before the application is executed on a particular hardware platform.

The compiler works on a single source file (compile unit) at a time to generate object files. The compiler generates object code without knowing the final address or displacement of the code/data. Specifically, the compiler generates object code that will access a TOC for variable values without knowing the final size of the TOC or offsets/addresses of various data sections. Placeholders for this information are left in the object code and updated by the linker. A TOC is a variable address reference table that is utilized, for example in an AIX environment, to access program variables in a manner that supports shared libraries and is data location independent. A similar structure, referred to as a global offset table (GOT), performs a similar function (e.g., indirect and dynamically relocatable access to variables) in a LINUX environment. One difference between a TOC and a GOT is that a TOC may contain actual data, where a GOT only contains addresses (pointers) to data. In the Linux PowerPC 64-bit environment the TOC contains the GOT section plus small data variables.

A static linker combines one or more separately compiled object files derived from distinct source files into a single module, and builds a single GOT and/or TOC for the module that is shared by files in the module. An executing application includes at least one module, a statically linked module typically containing the function main( ) as well as, optionally, several other functions, sometimes also known as the main module. Some applications may be statically linked, that is, all libraries have been statically integrated into the main module. Many applications also make use of shared libraries, sets of utility functions provided by the system or vendors to be dynamically loaded at application runtime and where the program text is often shared between multiple applications.

Each module in a computer program may have a different TOC pointer value. The TOC register or GOT register (referred to hereinafter as the TOC register) may therefore be saved and restored for each function call, either by a procedure linkage table (PLT) stub code segment, or by the callee function in conventions where the TOC register is treated as a preserved (i.e., callee-saved) register.

SUMMARY

Embodiments include a method, system, and computer program product for usage of a table of contents (TOC) register as an application register. An aspect includes receiving, by a computer system, application object code comprising a first function call from a calling function to a first callee function, and a symbol table entry in a symbol table of the application object code comprising a first TOC register usage indicator that is associated with the first callee function. Another aspect includes determining that the first callee function of the first function call does not require a TOC pointer based on the first TOC register usage indicator that is associated with the first callee function in the symbol table. Another aspect includes based on determining that the first callee function of the first function call does not require a TOC pointer, inserting a TOC save command and a TOC restore command corresponding to the first local function call into the application object code.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 5 illustrates a computer program product in accordance with an embodiment.

DETAILED DESCRIPTION

Figure 1:
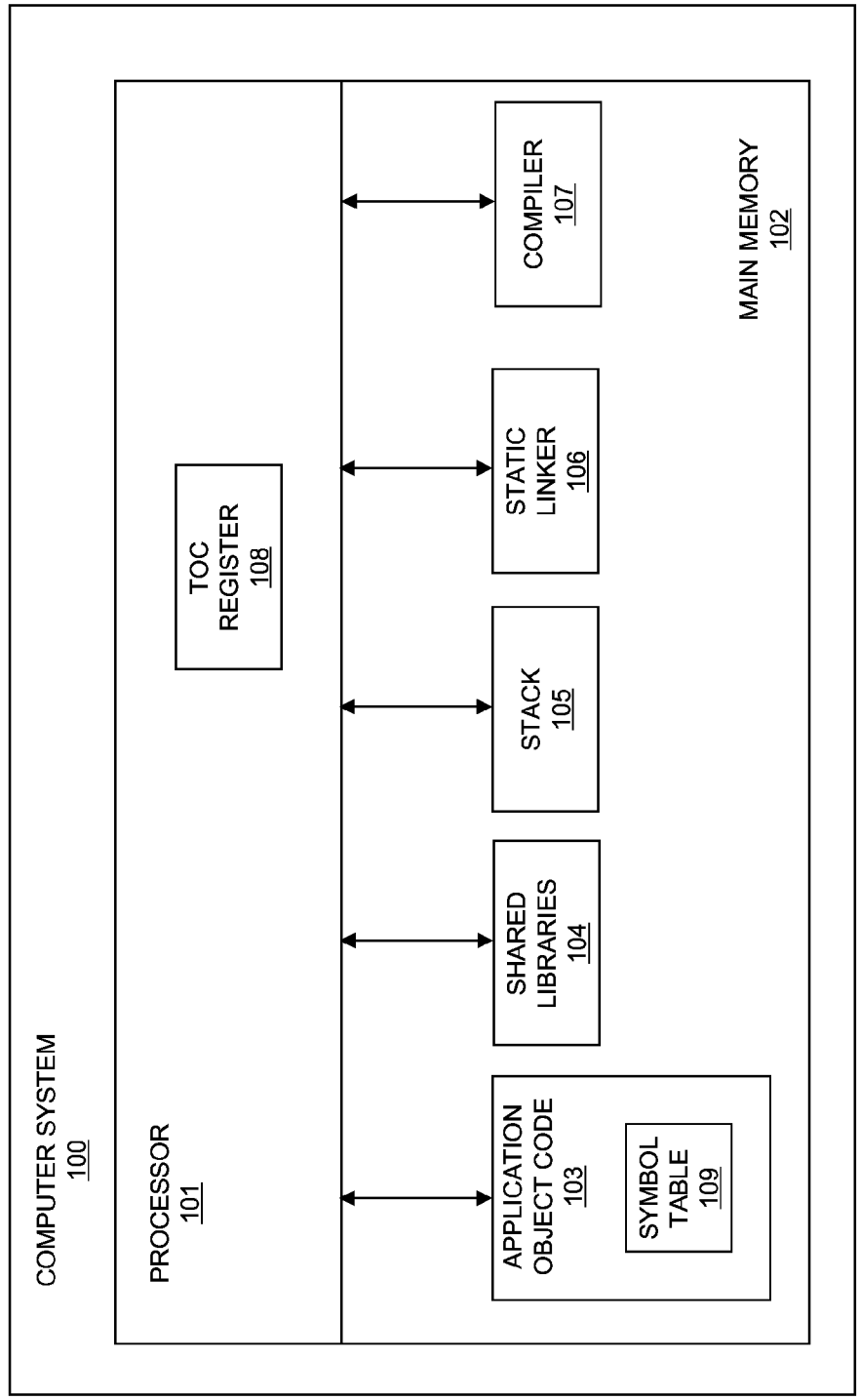
FIG. 1 depicts a computer system for use in conjunction with usage of a TOC register as an application register in accordance with an embodiment.

Embodiments of usage of a TOC register as an application register are provided, with exemplary embodiments being discussed below in detail. For a function call from a calling function to a callee function that is in the same module as the calling function (i.e., a local function call), the TOC pointer value is the same for the calling and the callee function, and the TOC pointer value in the TOC register does not need to be saved and restored in conjunction with the local function call, but is rather left in the TOC register for use by the callee function. However, for some local functions that may be called during execution of application object code, the TOC pointer is not necessary. For example, a callee function may not use any global data, or may use an addressing mode such a program counter (PC)-relative addressing, which makes the TOC pointer unnecessary for the callee function. Additionally, a function may make use of absolute addressing, i.e., accessing the data in a GOT and/or a TOC using absolute addresses, i.e., addresses having numeric values that can be directly derived by decoding the instruction stream (i.e., addresses stored in one or more instructions as a direct field). For a function that does not need a TOC pointer value in the TOC register, the TOC register (which may be register R2 in some embodiments) may be used as an application-defined register during execution of the callee function.

Object code may be generated by a compiler to take advantage of the TOC register as an application register by a callee function, either based on to a determination that a TOC pointer is not required by the callee function, or based on an indicator in the source code to generate code without the use of a TOC register. Based on the determination, the compiler further generates a symbol table entry having an indication that the function does not need a TOC pointer, but rather uses the TOC register as an application register.

The symbol table is generated by a compiler at the time of generating the application object code from corresponding program source code, and comprises a data structure that associates each identifier (e.g., function and variable names) in a program's source code with information relating to its declaration or appearance in the source code, such as type, scope level, and/or location. A TOC register usage indicator may be associated in the symbol table with any function in the application source code that does not require a TOC pointer. In some embodiments, the TOC register usage indicator(s) may be stored in a st_other field in the symbol table for each function listed in the symbol table. For example, a TOC register usage indicator may be a 1 bit field, having a first value that indicates that the function needs a TOC pointer (for example, 1) and a second value that indicates that the function does not need a TOC pointer (for example, 0). In further embodiments, the TOC register usage indicator may have any appropriate number of bits, and may have definitions corresponding to a plurality of values that give different manners of handling the TOC pointer and TOC register.

The TOC register is treated as a caller-saved register for such local function calls. In some embodiments, a static linker recognizes a function in application object code that does not need a TOC value based on an indication comprising a symbol table entry for the function that is stored in a symbol table of the application object code. In other embodiments, the indication may be stored in and associated with the function any other appropriate location. For such identified local functions, the static linker inserts a TOC save command and a TOC restore command into the application object code in conjunction with any calls to the local function. In further embodiments, for calls to functions that do not require a TOC pointer that are called by another module as external (or global) functions, the TOC register is also treated as a caller-saved register.

At static linking time, which is after compilation but before runtime of application source code, the static linker identifies any function that has a TOC register usage indicator that indicates that the function does not need a TOC pointer and uses the TOC register that normally holding the TOC pointer (e.g., register R2) as an application register, and inserts TOC save and restore commands before and after each call to any such function, so that the TOC register is treated as a caller-saved register. The TOC save and restore commands may comprise PLT code segments or trampolines in some embodiments. In some embodiments, the TOC store command may save the value in the TOC register (i.e., the TOC pointer value for the calling function) to a TOC save area in a stack frame corresponding to the calling function in the execution stack of the application source code before starting execution of the callee function. In some embodiments, the TOC restore command restores the value in the TOC save area in the stack frame corresponding to the calling function (i.e., the TOC pointer value for the calling function) back to the TOC register after completion of execution of the callee function.

FIG. 1 illustrates an embodiment of a computer system 100 for use in conjunction with usage of a TOC register as an application register. Computer system 100 comprises a processor 101 and a main memory 102. Application object code 103, which is generated from program source code (not shown) by a compiler such as compiler 107, comprises a plurality of functions, and is stored in main memory 102 for execution by processor 101. The application object code 103 may be generated by a compiler that is located on a different computer system from computer system 100. Application object code 103 includes a symbol table 109, which is generated by the compiler when the application object code 103 is generated. The symbol table 109 comprises a data structure that associates each identifier (i.e., function and variable names) in a program's source code with information relating to its declaration or appearance in the source code, such as type, scope level, and/or location. Shared libraries 104 comprise functions that are external to application object code 103 and that may be called during execution of application object code 103 via external function calls. Stack 105 comprises a data structure that stores information, including a TOC pointer, related to active functions during the execution of application object code 103. Each active function in application object code 103 has a respective stack frame in stack 105 during execution. Static linker 106 comprises a component that inserts TOC save and restore commands in application object code 103 based on the TOC register usage indicator(s) corresponding to symbols in symbol table 109 before runtime of the application object code 103. TOC register is a hardware register located in processor 101. TOC register 108 stores a value of a TOC pointer for the currently active function of application object code 103 (i.e., the function that is currently executing) when a TOC pointer is used by a function. The TOC register 108 may be register R2 in some embodiments. In further embodiments of a computer system such as computer system 100, the TOC register 108 may store a GOT pointer value instead of a TOC pointer value, and GOT save and restore points may be managed in application object code 103 by static linker 106 when a GOT us used by the function. In various embodiments, at least one function in application object code 103 uses the TOC register 108 as an application register when the TOC register 108 is not storing a TOC pointer or GOT value.

Figure 2:
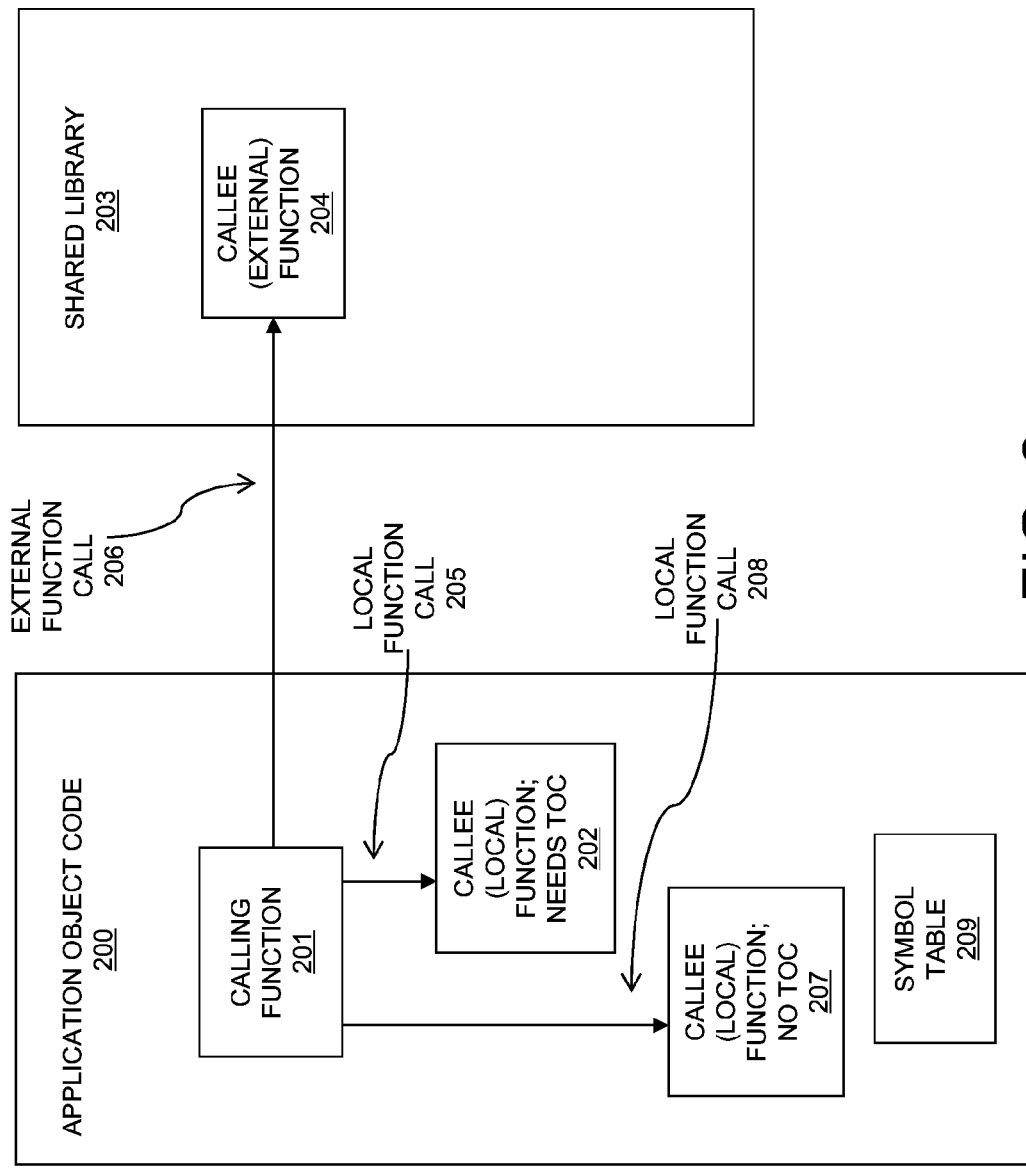
FIG. 2 depicts local and external function calls accordance with an embodiment.

FIG. 2 illustrates embodiments of local function calls 205 and 208, and an external function call 206. FIG. 2 is discussed with reference to FIG. 1. Application object code 200 may comprise application object code 103 of FIG. 1, and shared library 203 may comprise shared libraries 104 of FIG. 1. Calling function 201, callee function 202, and callee function 207 are part of application object code 200, and callee function 204 is part of shared library 203. If the calling function 201 and the callee function 202 are both part of application object code 200 and the callee function 202 requires a TOC pointer, the callee function 202 is local to the calling function 201 and the call is a local function call 205, and the calling function 201 and the callee function 202 have the same TOC pointer value, so the TOC pointer value does not need to be save and restored in conjunction with the local function call 205. If the callee function 207 does not require a TOC pointer and instead uses the register normally serving as TOC register 108 as another type of register (such as a normal application defined register) during execution, as indicated by the TOC register usage indicator associated with the callee function 202 in symbol table 109/209, the TOC pointer value does need to be saved and restored in conjunction with the local function call 208. If the calling function 201 is part of the application object code 200, and the callee function 204 is in the shared library 203, then the callee function 204 is external to the calling function 201 and the call is an external function call 206, and the calling function 201 and the callee function 204 have different TOC pointer values. Thus, the linker inserts TOC save and restore commands in conjunction with any external function call. When calling function 201 performs an external function call 206 to callee function 204, or when calling function 201 performs a local function call 208 to callee function 207 that does not require a TOC pointer and may use the TOC register 108 for another purpose in its own code or in one of its callees, when execution passes from the calling function 201 to the callee function 204/207, the value of the TOC pointer of the calling function 201 is saved from TOC register 108 to the stack frame for the calling function 201 in the stack 105. When the callee function 204/207 exits and execution passes back to the calling function 201, the value of the TOC pointer of the calling function 201 is restored to the TOC register 108 from the stack frame for the calling function 201 in the stack 105. FIG. 2 is shown for illustrative purposes only; any number of functions may be included in application object code 200 and shared library 203, and these functions may call one another in any appropriate manner. Some embodiments of a local function such as callee function 202 may require a TOC pointer, while other embodiments of a local function such as callee function 207, or an external function such as callee function 204, may not require a TOC pointer.

Figure 3:
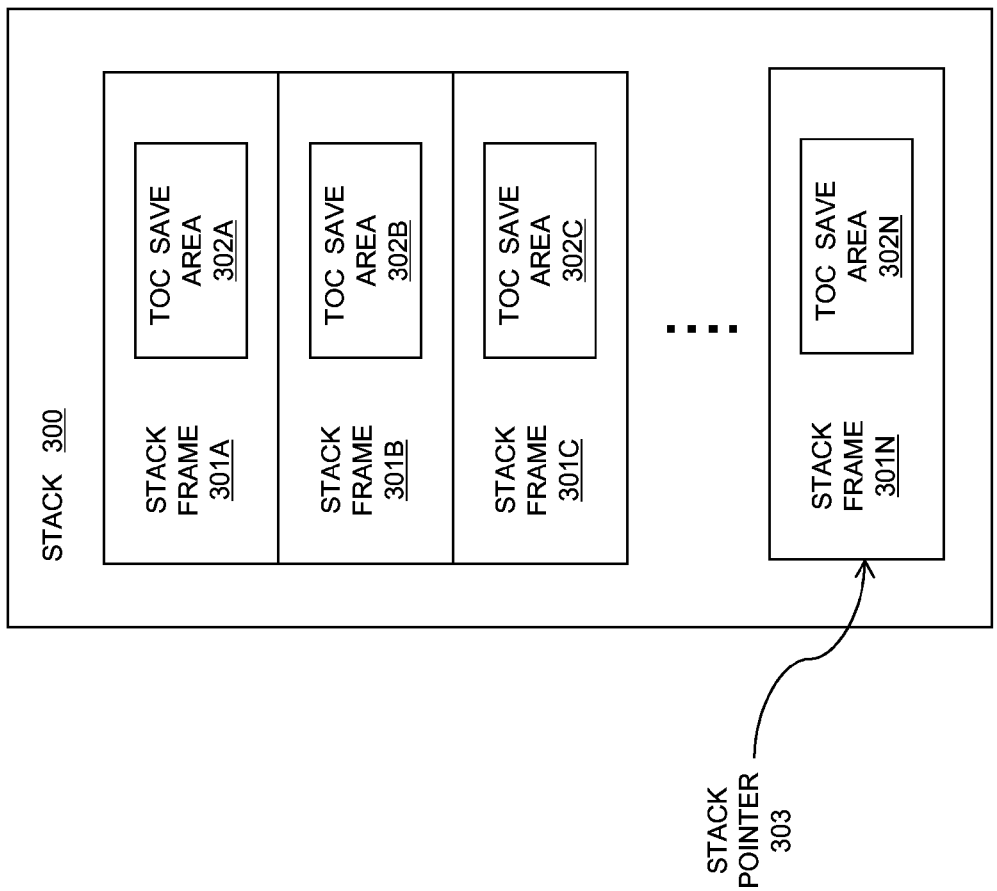
FIG. 3 depicts a stack for storage of a TOC pointer value in accordance with an embodiment.

FIG. 3 illustrates an embodiment of a runtime stack 300. Stack 300 may comprise stack 105 of FIG. 1. FIG. 3 is discussed with reference to FIGS. 1 and 2. Stack 300 includes a plurality of stack frames 301A-N corresponding to active functions that are currently being executed during execution of application object code 103 by processor 101. The stack 300 grows downwards from stack frame 301A, and a stack pointer 303 points to the most recently added stack frame 301N on the stack 300. Each stack frame of stack frames 301A-N stores information regarding its respective function, and includes a respective TOC save area 302A-N. When a calling function 201 calls a callee function 207 that has a TOC register usage indicator in symbol table 109/209 that indicates that the callee function 207 does not require a TOC pointer and the associated hardware register (for example, R2) is used for another purpose by the function, or may be so used by one of the callee function's callees, the TOC pointer value of the calling function 201 is saved from the TOC register 108 to the TOC save area of the calling function's stack frame (for example, TOC save area 302N in stack frame 301N) in stack 300 for restoration to the TOC register 108 after the callee function 207 completes and execution passes back to the calling function 201. In further embodiments, a TOC register save area 302A-N may also used to store the value of the TOC register 108 for the function associated with the TOC register save area's stack frame for functions that use the TOC register 108 as an application-defined register and do not have a TOC pointer, in a conjunction with the caller-saved register convention.

Figure 4:
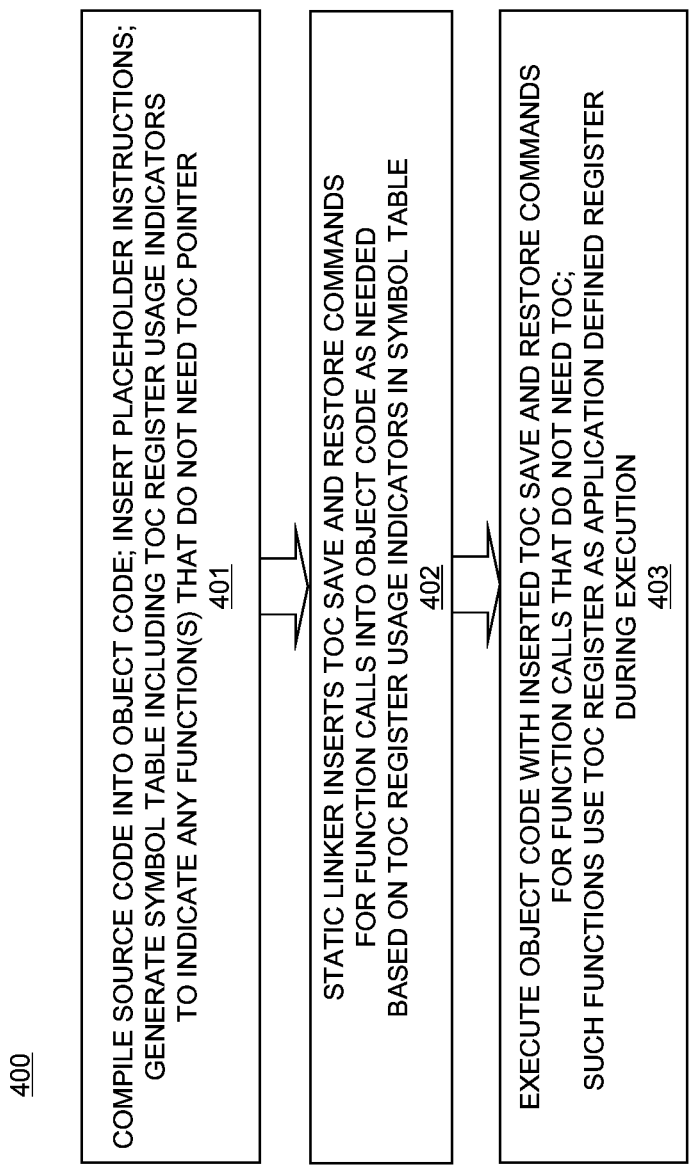
FIG. 4 depicts a process flow for usage of a TOC register as an application register in accordance with an embodiment.

FIG. 4 illustrates an embodiment of a method 400 for usage of a TOC register as an application register. FIG. 4 is discussed with respect to FIGS. 1-3. First, in block 401, before runtime, a compiler, such as compiler 107, generates application object code 103 from program source code (not shown). The compiler that generates application object code 103 may be located on another computer system that is distinct from computer system 100. The compiler inserts placeholder instructions, which may comprise no operation (NOP) instructions in some embodiments, or TOC save and restore commands in other embodiments, at TOC save and restore points corresponding to all of the function calls in the application object code 103 during compiling. The placeholder instructions act as placeholders for TOC save and restore commands that may be inserted by static linker 106 after compilation and before runtime. In further embodiments, placeholder instructions corresponding to TOC save and restore points may be inserted manually by a programmer into program source code that comprises assembly code. Any appropriate number of placeholder instructions may be inserted at any appropriate location in conjunction with each function call in various embodiments. In some embodiments, two placeholder instructions may be inserted adjacent to each function call (both external and local) in the application object code 103. In some embodiments in which the TOC register 108 is a caller-saved register, there may be a first placeholder instruction inserted before each function call in a calling function corresponding to a TOC save point, and a second placeholder instruction inserted after each function call in a calling function corresponding to a TOC restore point. In other embodiments in which the TOC register 108 is a callee-saved register, the placeholder instructions corresponding to TOC save and restore points may be inserted at the beginning and the end of a callee function. In further embodiments, the compiler may insert a placeholder instruction after a function call, but not before to the function call. Table 1 illustrates an example of pseudocode corresponding to the application object code after block 401, with placeholder instructions that comprise NOP instructions.

TABLE 1

| Example pseudocode with inserted NOP instructions | |
|---|---|
| f( ) | //calling function |
| { | |
| NOP | //first NOP for call to d( ) |
| d( ) | //call to local function that needs TOC |
| NOP | //second NOP for call to d( ) |
| NOP | //first NOP for call to g( ) |
| g( ) | //call to local function that does not need TOC |
| NOP | //second NOP for call to g( ) |
| } | |

During block 401, at the time of compiling, the compiler also generates a symbol table 109 for the application object code 103. The symbol table 109 includes a list of functions and variables that are used in the application object code 103, and gives various characteristics such as type, scope level, and/or location for the listed functions and variables. The symbol table 109 includes TOC register usage indicators that may indicate any functions (local or external) that do not need a TOC pointer value to be stored in TOC register 108, but rather may use TOC register 108 as an application register. A TOC register usage indicator for a function may comprise a "st_other" field associated with the function in the symbol table 109, and may be a 1-bit field in some embodiments. In further embodiments, the "st_other" field may be any appropriate length, such as a 3-bit field, which is discussed in further detail below. Table 2 illustrates an example of an excerpt of a symbol table 109 corresponding to the pseudocode of Table 1 that uses a single bit indicator in st_other for TOC register use.

TABLE 2

Excerpt of example symbol table corresponding to pseudocode of Table 1

| | |
|---|---|
| f( ) : st_other = 1 | //calling function, needs TOC pointer |
| d( ) : st_other = 1 | //callee function, needs TOC pointer |
| g( ) : st_other = 0 | //callee function, does not need TOC pointer |

Next, in block 402, after compilation and before runtime of the application object code 103, static linker 106 inserts TOC save and restore commands, as needed, into the application object code 103 in the locations indicated as TOC save and restore points, respectively. In one embodiment, TOC save and/or restore points are indicated by the presence of one or more a placeholder instructions associated with a function call, such as a bl instruction in accordance with the Power ISA. In another embodiment, a relocation type may used to explicitly identify the location of a TOC save and/or restore point for a function call when a compiler has inserted a TOC save and/or TOC restore point. TOC save and restore commands are inserted for external function calls 206, but are not inserted for local function calls 205 that require a TOC pointer value in TOC register 108 during execution, as, for such a local function call 205, the TOC pointer value is the same for the calling function 201 and callee function 202. For a local function call 208 to a callee function 207 that does not require a TOC pointer and instead uses the TOC register 108 as an application-defined register, as indicated by the TOC register usage indicator for the callee function 207 in symbol table 109/209, the static linker 106 inserts TOC save and restore commands around all calls to the callee function 207 in the application object code 103.

When resolving a local function call 205 to a local function that uses a TOC, no TOC save and restore instructions are inserted by the linker for a corresponding call site. In some embodiments, when resolving a call 208 to a local function that does not use a TOC, the static linker 106 replaces a first placeholder instruction associated with the local function call 208 that does not need a TOC with an instruction that stores the TOC pointer value of the calling function 201 from the TOC register 108 to the TOC save area in the stack frame of the calling function 201 in stack 105 (for example, TOC save area 302N in stack frame 301N in FIG. 3), and replaces a second placeholder instruction associated with the local function call 208 that does not need a TOC with an instruction that restores the saved TOC pointer value from the TOC save area in the stack frame of the calling function 201 in stack 105 to the TOC register 108. When a compiler has not inserted a placeholder instruction for a TOC save point, in one embodiment, the static linker 106 may issue an error. When a compiler did not insert a placeholder instruction for a TOC save point in block 401, in another embodiment, the static linker 106 inserts a call to a trampoline that includes a TOC save before performing the local function call.

In some embodiments, when resolving a call to a runtime-resolved function representing a possibly module-external function, the static linker 106 replaces a first placeholder instruction associated with the external function call 206 with an instruction that stores the TOC pointer value of the calling function 201 from the TOC register 108 to the TOC save area in the stack frame of the calling function 201 in stack 105 (for example, TOC save area 302N in stack frame 301N in FIG. 3), and replaces a second placeholder instruction associated with the external function call 206 with an instruction that restores the saved TOC pointer value from the TOC save area in the stack frame of the calling function 201 in stack 105 to the TOC register 108. When a compiler has not inserted a placeholder instruction for a TOC save point, in another embodiment, the compiler inserts a call to a trampoline that includes a TOC save before performing the call. The compiler further updates the call instruction to the function to be resolved at runtime to a possibly module external function with a call instruction to a PLT stub that is generated by the static linker 106 to locate the possibly module external function at runtime and insert a call to the located function. In one embodiment, when a compiler has not inserted a placeholder instruction for a TOC save point in block 401, the static linker 106 inserts a call to a PLT stub that includes a TOC save instruction.

Table 3 illustrates an example of pseudocode corresponding to the pseudocode of Table 1 after completion of block 402. In Table 3, no TOC save/restore is performed in conjunction with the local function call to d( ), however, a TOC save/restore is performed in conjunction with the local function call to g( ) so that g( ) may use TOC register 108 as an application-defined register during execution.

TABLE 3

Example pseudocode with replaced NOP instructions

| | |
|---|---|
| f( ) | //calling function |
| { | |
| NOP | //first NOP for call to d( ) |
| d( ) | //call to local function that needs TOC |
| NOP | //second NOP for call to d( ) |
| save TOC for d( ) | |
| g( ) | //call to local function that does not need TOC |
| restore TOC for d( ) | |
| } | |

In further embodiments, the static linker 106 may generate fixup code in block 402 of FIG. 4 when the calling function cannot be readily modified to perform the necessary TOC save and restore. Table 4 shows an example of a function call including fixup code because a TOC save cannot be directly inserted in the calling function.

TABLE 4

Example pseudocode with fixup code

| | |
|---|---|
| f( ) | //calling function |
| { | |
| NOP | //first NOP for call to d( ) |
| d( ) | //call to local function that needs TOC |
| NOP | //second NOP for call to d( ) |
| trampoline_for_g( ) | //call to a trampoline for a local function // that does not need TOC |
| restore TOC for d( ) | |
| } | |
| trampoline_for_g: | |
| save TOC for d( ) in TOC save slot of d( ) stack frame | |
| jump to g( ) | |

Lastly, in block 403, the application object code 103 is executed by processor 101. For any local function call 208 to a callee function 207 that does not need a TOC pointer, the value of the TOC register 108 is saved before the callee function 207 begins execution, and restored to the TOC register 108 when the callee function 207 has completed execution, allowing the callee function 207 to use the TOC register 108 as another type of register during execution.

Technical effects and benefits include allowing use of the TOC register as an application-defined register by functions that do not require a TOC pointer.

Referring now to FIG. 5, in one example, a computer program product 500 includes, for instance, one or more storage media 502, wherein the media may be tangible and/or non-transitory, to store computer readable program code means or logic 504 thereon to provide and facilitate one or more aspects of embodiments described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for usage of a table of contents (TOC) register as an application register, the system comprising:
   a memory having computer readable instructions; and
   a processor configured to execute the computer readable instructions, the instructions comprising:
      receiving, by the computer system, application object code comprising a first function call from a calling function to a first callee function, and a symbol table entry in a symbol table of the application object code comprising a first TOC register usage indicator that is associated with the first callee function;
      determining that the first callee function of the first function call does not require a TOC pointer based on the first TOC register usage indicator that is associated with the first callee function in the symbol table; and
      based on determining that the first callee function of the first function call does not require a TOC pointer, inserting a TOC save command and a TOC restore command corresponding to the first function call into the application object code.

2. The system of claim 1, further comprising:
   receiving, by a compiler, application source code comprising the first function call;
   generating, by the compiler, the application object code and symbol table based on the application source code, the generating comprising:
      determining, by the compiler, that the first callee function of the first function call does not require a TOC pointer; and
      inserting the first TOC register usage indicator for the first callee function into the symbol table in the application object code by the compiler.

3. The system of claim 1, wherein the first TOC register usage indicator comprises a st_other field in the symbol table, and wherein each function of the application source code has a respective associated TOC register usage indicator comprising a st_other field in the symbol table that indicates whether the associated function requires a TOC pointer.

4. The system of claim 1, wherein the received application object code comprises a placeholder instruction corresponding to a first TOC save or restore point of the first function call, wherein the placeholder instruction was inserted into the application object code by a compiler that generated the application object code, and further comprising inserting one of the TOC save command and the TOC restore command in place of the placeholder instruction.

5. The system of claim 1, wherein the TOC save command comprises trampoline code that is generated by a static linker of the computer system.

6. The system of claim 1, further comprising using a TOC register of the computer system as an application-defined register by the first callee function during execution of the first callee function.

7. The system of claim 1, wherein the TOC save command comprises a command to save a TOC pointer value of the calling function from a TOC register of the computer system to a TOC save area in a stack frame corresponding to the calling function in a runtime stack of the computer system before execution of the first callee function, and wherein the TOC restore command comprises a command to restore the TOC pointer value of the calling function from the TOC save area to the TOC register after completion of execution of the first callee function.

8. The system of claim 1, wherein the determining and inserting are performed by a static linker of the computer system, and wherein the first function call comprises a local function call.

* * * * *